May 23, 1972 — C. E. LONG — 3,664,684

TWO-PASSENGER CYCLE

Filed July 1, 1970 — 2 Sheets-Sheet 1

INVENTOR.
CYRIL E. LONG.
BY
Nilsson, Robbins, Wills & Berliner
Attorneys.

INVENTOR.
CYRIL E. LONG.
BY
Nilsson, Robbins, Wells & Berliner
Attorneys.

United States Patent Office 3,664,684
Patented May 23, 1972

3,664,684
TWO-PASSENGER CYCLE
Cyril E. Long, 3055 Hayes, Costa Mesa, Calif. 92626
Filed July 1, 1970, Ser. No. 51,429
Int. Cl. B62k 5/04
U.S. Cl. 280—231
13 Claims

ABSTRACT OF THE DISCLOSURE

A two-passenger tricycle in which separate saddle and handlebars are provided on opposite sides of an axis defined by a medial, longitudinal frame member. A central crankshaft is journaled across the longitudinal axis and a set of pedals are provided on each side of the longitudinal axis. An inboard pedal of each set of pedals is connected by crank arms to the central crankshaft which, in turn, is connected by sprocket wheels and chain to a drive wheel. The medial seating surface of the saddles are spaced a greater distance horizontally from the axis of rotation of the crankshaft than vertically therefrom so that the horizontal thrust vector on the pedal is greater than the vertical thrust vector, allowing push pedaling. Other features include a novel brake control, rear mounting feet for vertical storage and knockdown construction.

FIELD OF THE INVENTION

The field of art to which the invention pertains includes the field of wheeled velocipedes, particularly of the plural occupant propulsion type.

BACKGROUND AND SUMMARY OF THE INVENTION

Two-passenger cycles are popular in parks and resort communities in that they enable the riders to enjoy cycling together and both tandem and side-by-side arrangements have been provided. The side-by-side cycles usually take the form of a two-passenger tricycle, such as the tricycles disclosed in U.S. Pats. 310,998, 553,615, and 615,796. Although such tricycles would appear to offer more social enjoyment than tandem cycles, it is the tandem cycles which have been by far the most popular. Perhaps a reason for this is that the two-passenger tricycles have generally been constructed with a rectangular outer framework which, in combination with an adjacent rider, generates a restrictive feeling. Furthermore, the propulsion system of such tricycles have not been entirely satisfactory and generally involve separately mounted treadles or cooperatively connected pedals which are journaled through an outboard mount. Such arrangements are further restrictive resulting in general disfavor with two-passenger tricycles.

The present invention provides a two-passenger cycle in the form of a tricycle which does not suffer the foregoing drawbacks. Open construction is provided highlighted by ease of access to the saddles and pedals. The tricycle includes a frame having a longitudinal, substantially medial member which defines a longitudinal frame axis. This medial member is supported by a pair of rear wheels laterally of the longitudinal axis and a front, central steering wheel. A central crankshaft is carried below the medial member journaled across the longitudinal axis and is fitted with a sprocket wheel. One of the rear wheels serves as a drive wheel and has an axle fitted with a sprocket wheel which is connected to the crankshaft sprocket wheel by a chain and driven thereby. Separate saddles and handlebars are provided on each side of the longitudinal axis and steering control is connected to one only of the handlebars. A set of oppositely directed pedals are journaled for rotation on each side of the longitudinal axis and are connected to the central crankshaft. Importantly, crank arms connect the inboard pedals of each set to opposite sides of the central crankshaft so as to cooperatively rotate the crankshaft. Inboard interconnection of the pedals in conjunction with the aforenoted medial member allows ready access to the pedals and the walk-in open characteristic of this novel tricycle.

Another characteristic of the present construction is that the seats are relatively low slung, imparting a low center of gravity to the tricycle so that, with two riders, tipping of the tricycle is virtually impossible. This disposition of the saddles also enables the pedals to be operated by pushing horizontally so that the riders can push against the seat in turning the pedals. Specifically, the medial seating surface of the seat is spaced a substantially greater distance horizontally than vertically from the axis of rotation of the crankshaft whereby the horizontal thrust vector on the pedals is greater than the vertical thrust thereon.

Brakes are provided on the front wheel as well as on the two rear wheels, mounted rearwardly thereon. Independent hand controls are mounted on one of the handlebars for the rear brakes. Front brake controls are mounted on the medial frame member to project upwardly therefrom so that either rider can apply the brakes to the front wheel. A gear shift is also centrally mounted on the medial member with an upwardly projecting shift lever.

As a further feature, rubber feet having flat rear surfaces are mounted rearwardly of each rear wheel permitting the cycle to be stored on its rear end with the front end of the cycle projecting upwardly, thereby conserving storage space. The cycle is constructed so as to be easily knocked down, simple bolts and brackets being used to connect the lateral components to the longitudinal medial frame member.

DETAILED DESCRIPTION

As required, a detailed illustrative embodiment of the invention is disclosed herein. However, it is to be understood that while this embodiment exemplifies the invention, the invention may take many different forms that are radically different from the specific illustrative embodiment disclosed. Therefore, specific structural and functional details are not to be interpreted as limiting, but merely as a basis for the claims which define the scope of the invention. In this regard, the illustrated embodiment comprises a two-passenger tricycle; however, some of the principles described herein are applicable to a one-passenger tricycle. With a single seat, the low slung features of the tricycle would make it ideal for a safety cycle for elderly persons and a drag racer for teenagers.

Figure 1:
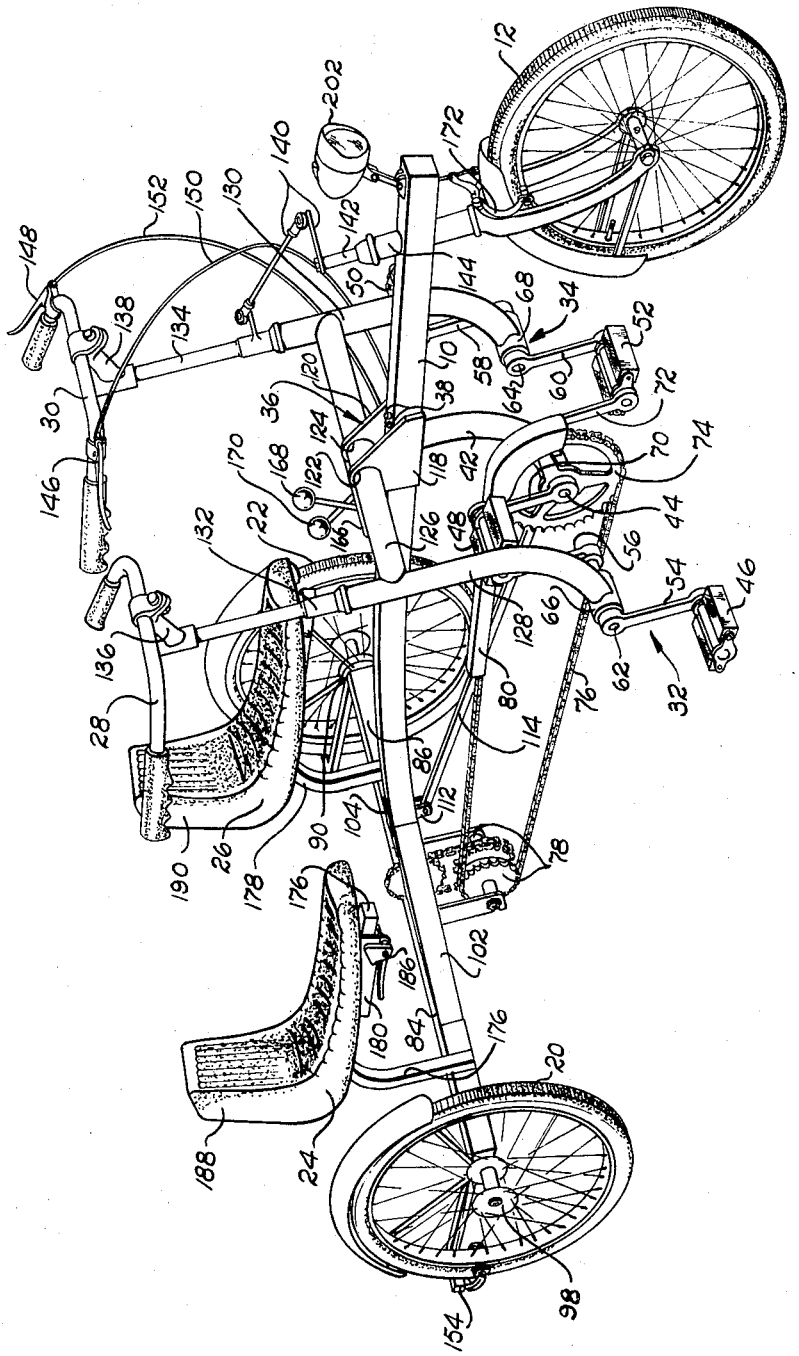
FIG. 1 is a perspective view of a two-passenger tricycle as constructed herein.
Figure 2:
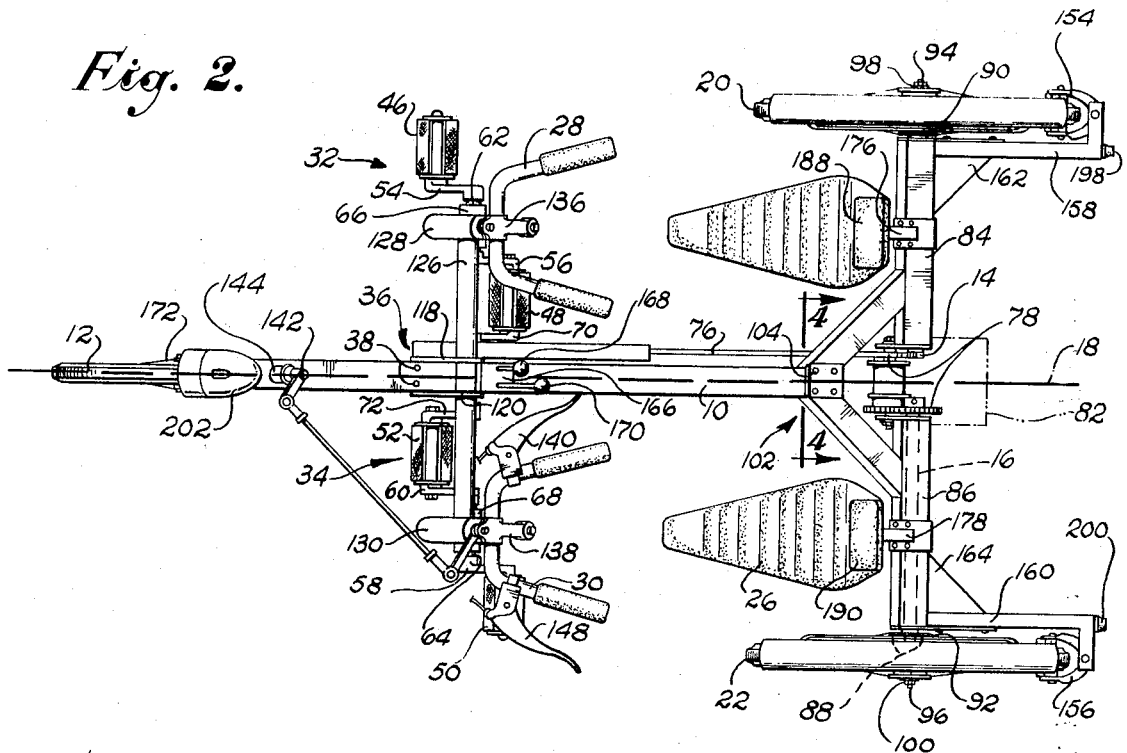
FIG. 2 is a plan view of the tricycle.
Figure 3:
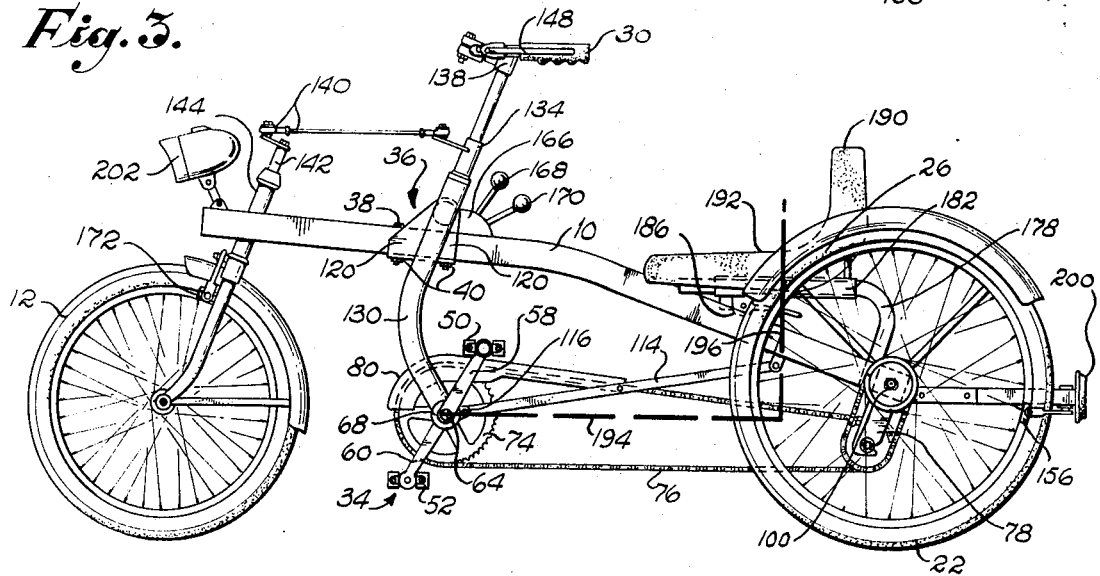
FIG. 3 is an elevational view of the tricycle.

Referring to FIGS. 1–3, an important component of the present two-passenger tricycle is a substantially medial longitudinal member 10 which constitutes a frame for the tricycle and which is connected to or carries the operative components of the tricycle. The medial member 10 is formed of a single bar of square cross-section, but can also be constructed of narrower adjacent parallel bars, and extends from the front to the rear of the tricycle. The front end of the medial member 10 is supported over a front wheel 12, and the rear end is curved downwardly for connection to rear wheel axles 14 and 16. The medial member 10 defines a longitudinal frame axis 18 (FIG. 2) constituting a plane of symmetry for the tricycle.

Rear wheels 20 and 22 are supported on their respective axles 14 and 16 laterally of the longitudinal axis 18 and a pair of saddles 24 and 26 are supported between the rear wheels 20 and 22, also on opposite sides of the longitudinal axis 18. A pair of handlebars 28 and 30 are supported on opposite sides of the medial member 10, but only one handlebar 30 is connected to steer the front wheel 12, as will hereinafter be detailed. A pair of oppositely directed pedals 32 depend downwardly from one of the handles 28 on one side of the medial member 10 and another pair of oppositely directed pedals 34 is supported downwardly from the other handlebar 30 on the opposite side of the medial member 10.

The tricycle is thus constructed so that two riders can be seated comfortably therein, each holding onto a handlebar 28 or 30 and each manipulating a set of pedals 32 and 34; however, only one rider controls steering. As will be described in more detail hereinafter, the sets of pedals 32 and 34 are interconnected in such manner that open access to the saddles and the pedals is provided. This is of great importance to elderly people and contributes to the great usefulness and enjoyment of the present tricycle. Also, as will be further described hereinafter, the saddles 24 and 26 are low slung providing a low center of gravity and enabling the tricycle to be propelled by a horizontal push action on the pedals rather than by solely a vertical thrust.

Referring to specific features of construction, a U-shaped bracket 36 is bolted with its closed end down toward the front end of the medial member 10 by means of bolts 38 and nuts 40. A connecting bar 42 is welded to the bottom of the bracket 36 to depend downwardly from the medial member 10. The connecting bar 42 curves somewhat rearwardly and is formed with an opening at its lower end through which a central crankshaft 44 is journaled. The central crankshaft 44 extends transverse to the longitudinal frame axis 18 beneath the medial member 10 and constitutes the connecting link between the two sets of foot pedals 32 and 34. Each set of foot pedals 32 and 34 includes oppositely directed pedals 46, 48 and 50 and 52, respectively connected via crank arms 54, 56 and 58, 60, respectively, to lateral crankshafts 62 and 64. The lateral crankshafts 62 and 64 are journaled through collars 66 and 68 which are supported in line with the central crankshaft 44.

An important aspect to the present invention involves the manner by which the pedal sets 32 and 34 are interconnected and the manner by which they transmit power to drive the tricycle. The inboard pedals 48 and 52 of each pedal set 32 and 34 respectively are connected by crank arms 70 and 72 to opposite sides of the crankshaft 44 and by such means rotation of either or both of the sets of pedals 32 and 34 results in rotation of the crankshaft 44. A walk-in construction is provided by such inboard mounting allowing ready, open access to the pedals.

A sprocket wheel 74 is carried by the central crankshaft 44 and communicates via a chain 76 with a geared-down sprocket system 78 as commonly utilized on gear-shift bicycles. A fender 80 is connected to the connecting bar 42 to cover the forward top portion of the chain 76. As more clearly depicted in FIG. 2, the sprocket system 78 is geared into one of the axles 76 but not into the other axle 14. Such arrangement allows the use of supplementary propulsion power in the form of an electric motor or gasoline motor, as indicated schematically by the dashed box 82, to be connected to the other axle 14, so that supplementary power can be utilized as desired to propel the tricycle.

Figure 4:
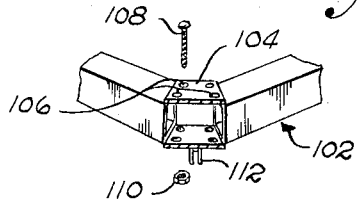
FIG. 4 is a perspective view of a connecting member, taken on the line 4—4 of FIG. 2 in the direction of the arrows and rotated for clarity.

The axles 14 and 16 are journled within hollow, square support bars 84 and 86 and terminate outwardly with three driving dogs such as at 88, which engage corresponding openings in the wheel hubs 90 and 92. The wheels 20 and 22 are centrally secured with bolts 94 and 96 and nuts 98 and 100. The support bars 84 and 86 are welded to the arms of a triangular member 102 which is formed with a central bracket 104 of hollow square cross-section for engagement with the square-cross-sectional rear end of the medial member 10. The triangular member is shown in greater detail in FIG. 4 where it is seen that openings 106 are provided through which bolts such as 108 can be threaded through corresponding openings in the medial member 10, through the bracket 104 and secured therebelow by nuts such as 110. By such means, the rear axle assembly carrying the wheel 20 and 22 can be readily and quickly removed from the medial member 10. The bracket 104 carries an ear 112 downwardly therefrom and a brace bar 114 is secured between the ear 112 and another ear 116 on the connecting bar 42 so as to aid in supporting the central crankshaft 44.

Referring now to the disposition of the handlebars 28 and 30, the U-shaped bracket 36 which is connected to the medial member 10, as hereinbefore described, is provided with upstanding ends 118 and 120, formed with openings 122 and 124. A crossbar 126 is disposed through the openings 122 and 124 and is welded to the ends 118 and 120. The crossbar 126 carries connecting bars 128 and 130 on opposite ends thereof which extend downwardly in curved-back fashion and which are welded at their bottom ends to the lateral crankshaft collars 66 and 68. The connecting bars 128 and 130 also extend upwardly from the crossbar 126 and are formed hollow thereat so as to receive handlebar shafts 132 and 134. The handlebars 28 and 30 are mounted on the shafts 132 and 134 by mount members 136 and 138 as commonly practiced. The steering handlebar 138 is mounted so as to rotate within the connecting bar 130. The other handlebar 128 can be mounted for rotation or not, as desired.

A steering linkage 140 connects the steering handlebar shaft 134 to a steering post 142. The steering post 142 is journaled through a collar 144 which, in turn, is disposed through and welded to the medial member 10. The opposite, downward end of the steering post 142 is connected to a steering fork in the usual manner which, in turn, is connected to and controls the turning of the front wheel 12.

Hand brake controls 146 and 148 are mounted on the steering handlebar 30 and are connnected by cables 150 and 152 (FIG. 1) to the rear brakes 154 and 156. The rear brakes 154 and 156 are carried by extension members 158 and 160 rearwardly of the lateral wheel 20 and 22. The extension members 158 and 160 are secured by welding to the rear of the support bars 84 and 86, the connection being reinforced by gussets 162 and 164 welded between the extension members 158 and 160, and the support bars 184 and 186 (FIG. 2).

A control console 166 is mounted just rearwardly of the crossbar 126 and includes a brake lever 168 and gear shift lever 170, each projecting upwardly from the medial member 10. The brake lever 168 is connected by the cable (hidden from view) to control brakes 172 mounted on the steering post collar 144 at the top rear of the front wheel 12. The gear shift 170 is connected by linkages (hidden from view) to a three-speed hub 174 component of the sprocket system 78 in the usual manner as is well known in gear shift bicycles. By such arrangement the driver has full control of the gear shift and rear brakes. The other rider can, if necessary, apply the brakes to the front wheel 12 by pulling back on the console brake lever 168.

Referring now to the manner in which the saddles 24 and 26 are disposed, each saddle 24 and 26 is carried on top of a curved bar 176 and 178 having a downwardly turned leg bolted to the front of the respective support bars 84 and 86. Each saddle 24 and 26 is connected to the respective curved bars 176 and 178 by means of a sliding collar 180 and 182 and is adjustable thereon by means of a lever and pin mechanism 184 and 186 which registers with selected openings (not shown) in the curved bars 176 and 178. The saddles 24 and 26 are formed with back supports 188 and 190 which aid in enabling the rider to operate the pedals.

The saddles 24 and 26 are disposed in a unique relationship with respect to the central crankshaft 4. They are set relatively low so as to be low slung and so as to enable the rider to obtain propulsion by pushing with horizontal thrust on the pedals rather than by merely using vertical thrust. In this regard, the back supports 188 and 190 aid the rider in manipulating the pedals. In particular, and referring specifically to FIG. 3, the medial seating surface of each saddle, as indicated at 192, is spaced substantially a greater distance horizontally (as indicated at 194) from the axis of rotation of the crankshaft 44 than vertically (as indicated at 196) therefrom. Accordingly, the horizontal thrust vector on the pedals is greater than the vertical thrust vector. This enables the rider to obtain propulsion by pushing horizontally on the pedals rather than by pushing only vertically and is particularly advantageous with older people. The low slung arrangement also makes the ride much safer in that the center of gravity of the tricycle with two riders is sufficiently low so as to make tipping of the tricycle virtually impossible. The riding posture is also found to be very enjoyable, yielding a unique riding experience.

Other features of the tricycle include flat ended rubber feet 198 and 200 which are mounted rearwardly of the extension members 158 and 160 and enable the tricycle to stand on its end. By such means the tricycle can be parked in a garage utilizing little more space than occupied by a regular bicycle.

Another feature is a headlight 202 which is mounted on the front top of the medial member 10, but which can be alternatively mounted on the front face thereof.

While the foregoing description has been with respect to a tricycle supporting two riders, it will be appreciated that many of the unique and inventive features herein can be utilized in the construction of a single passenger tricycle. In particular, the two saddles can be replaced by a single centrally supported saddle and the two handlebars replaced by a centrally supported handlebar with a single set of pedals. The steering linkage arrangement, low slung seat-crankshaft axis relationship, and other dimensions could remain the same, yielding a tricycle which can be utilized by a single person as a safety tricycle, particularly for the elderly, or which can be utilized by a youngster as a drag racer.

I claim:

1. A two-passenger tricycle comprising:
   a frame including a substantially medial member defining substantially central longitudinal frame axis;
   seating means on each side of said longitudinal axis;
   a steering wheel and control member therefor;
   a pair of wheels laterally of said longitudinal axis including a drive wheel;
   a crossbar carried by said medial member;
   first and second pedal support members carried downwardly from said crossbar on opposite sides of said medial member;
   a central crankshaft journaled across said longitudinal axis;
   first and second pairs of oppositely directed pedals journaled for rotation respectively through said first and second pedal support members and connected to opposite sides of said crankshaft for rotation thereof; and
   means for connecting said crankshaft to said drive wheel for rotation thereof.

2. The invention according to claim 1 including crank arms connecting the inboard pedals of each pair of pedals to said opposite sides of said crankshaft.

3. The invention according to claim 1 in which said steering wheel control member comprises a handlebar on said one side of said longitudinal axis, and said tricycle includes another handlebar on the other side of said longitudinal axis.

4. The invention according to claim 1 in which one only of said pair of lateral wheels is a drive wheel.

5. The invention according to claim 4 in which said means connecting said crankshaft to said drive wheel comprises a first sprocket wheel connected for rotation by said crankshaft, a second sprocket wheel connected to rotate said drive wheel and a chain connecting said first and second wheels.

6. The invention according to claim 1 including brakes on said steering wheel and control means for said brakes mounted on the medial member to project upwardly therefrom.

7. The invention according to claim 1 including rear axle means for said pair of lateral wheels and means for securing said rear axle means to said medial member.

8. The invention according to claim 1 including a first sprocket wheel on said crankshaft, an anxle for said drive wheel and a second sprocket wheel on said axle, said means for connecting said crankshaft to said drive wheel comprising a single central chain connecting said first and second sprocket wheels.

9. The invention according to claim 1 including rear axle means for said pair of wheels and means for housing said rear axle means, said seating means being carried by said housing means.

10. A two-passenger cycle, comprising:
    a frame including a substantially medial member defining a substantially central longitudinal frame axis;
    seating means on each side of said longitudinal axis,
    a steering wheel and control member therefor;
    a pair of wheels disposed rearwardly of said cycle laterally of said longitudinal axis, said pair of wheels including a drive wheel;
    a central crankshaft journaled across said longitudinal axis;
    a pair of oppositely directed pedals journaled for rotation on one side of said central crankshaft and connected to said crankshaft for rotation thereof;
    means for connecting said crankshaft to said drive wheel for rotation thereof; and
    a member of resilient material mounted rearwardly adjacent each said lateral wheel, the rear surface of said resilient members being formed flat whereby said cycle may thereby stand on its rear end with the front end of the cycle projecting upwardly.

11. A two-passenger cycle, comprising:
    a frame including a substantially medial member defining a substantially central longitudinal frame axis;
    seating means on each side of said longitudinal axis;
    a steering wheel and control member therefor;
    a pair of wheels laterally of said longitudinally axis including a drive wheel;
    a central crankshaft journaled across said longitudinal axis;
    a pair of oppositely directed pedals journaled for rotation on one side of said central crankshaft and connected to said crankshaft for rotation thereof;
    means for connecting said crankshaft to said drive wheel for rotation thereof;
    the medial seating surface of said seating means being spaced a substantially greater distance horizontally than vertically from the axis of rotation of said crankshaft whereby the horizontal thrust vector on said pedals is greater than the vertical thrust vector thereon.

12. A two-passenger tricycle, comprising:
    a frame including a longitudinal, substantially medial member defining a substantially central longitudinal frame axis;
    a saddle on each side of said longitudinal axis;
    a steering fork journaled on the front end of said longitudinal member;
    a steering wheel journaled on said fork;

a crossbar carried by said longitudinal member;
a handlebar carried upwardly from one end of said crossbar on one side of said longitudinal member and connected to control said steering wheel;
a handlebar carried upwardly from the other end of said crossbar on the opposite side of said longitudinal member;
pedal support members carried downwardly from each end of said crossbar on opposite sides of said longitudinal member;
a pair of oppositely directed pedals journaled for rotation at the bottom of each pedal support member;
a crankshaft support member carried downwardly from said longitudinal member;
a central crankshaft journaled through the bottom of said crankshaft support member;
crank arms connecting the inboard pedals of each pair of pedals to opposite sides of said central crankshaft for rotation of said crankshaft;
a sprocket wheel driven by said central crankshaft;
a pair of rear stationary wheels on opposite sides of said longitudinal axis including a drive wheel;
an axle for said drive wheel;
a sprocket wheel on said axle; and
a chain connecting said crankshaft sprocket wheel to said axle sprocket wheel whereby rotation of said pedals drives said drive wheel.

13. The invention according to claim 12 in which the medial seating surface of each of said saddles is spaced a substantially greater distance horizontally than vertically from the axis of rotation of said central crankshaft whereby the horizontal thrust vector of said pedals is greater than the vertical thrust vector thereon.

References Cited

UNITED STATES PATENTS

| | | | |
|---|---|---|---|
| 563,957 | 7/1896 | Grilli | 280——231 |
| 3,466,059 | 9/1969 | Kiernan | 280—7.15 X |
| 3,175,843 | 3/1965 | Burke | 280—231 X |
| 498,750 | 5/1893 | Matzen | 280—231 |
| 372,429 | 11/1887 | O'Brien | 280—231 |
| 3,096,100 | 7/1963 | Clarke et al. | 280—282 X |
| 615,796 | 12/1898 | Brosnihan | 280—231 |
| 3,511,521 | 5/1970 | Gobini | 280—278 X |

KENNETH H. BETTS, Primary Examiner

U.S. Cl. X.R.

280—282